United States Patent [19]

Fenster

[11] Patent Number: 4,628,357

[45] Date of Patent: Dec. 9, 1986

[54] DIGITAL FLUOROGRAPHIC SYSTEMS

[75] Inventor: Paul Fenster, Petach Tikvah, Israel

[73] Assignee: Elscint, Ltd., Haifa, Israel

[21] Appl. No.: 579,202

[22] Filed: Feb. 10, 1984

[51] Int. Cl.$^4$ .............................................. H04N 5/32
[52] U.S. Cl. ........................................ 358/111; 378/99
[58] Field of Search ................... 358/111; 378/98, 99; 128/653, 654; 364/414

[56] References Cited

U.S. PATENT DOCUMENTS

| | | | |
|---|---|---|---|
| 3,127,568 | 3/1964 | Sturm et al. | 358/111 X |
| 3,290,596 | 12/1966 | Bougle | 378/98 X |
| 4,346,406 | 8/1982 | Kato et al. | 358/111 X |
| 4,367,490 | 1/1983 | Riederer | 358/111 X |
| 4,375,068 | 2/1983 | McBride | 358/111 |
| 4,454,606 | 6/1984 | Relihan | 364/414 X |
| 4,468,697 | 8/1984 | Verhoeven | 358/111 |
| 4,482,957 | 11/1984 | Bjorkholm | 358/111 X |

Primary Examiner—Howard W. Britton
Assistant Examiner—Victor R. Kostak
Attorney, Agent, or Firm—Sandler & Greenblum

[57] ABSTRACT

An improved digital fluorographic system for displaying images of objects wherein the improvement is affected in the circuitry for log amplifying the video signal acquired of an object by base line clipping the amplified video signal to remove the chances of adverse results from the high rate of amplification for low input signals.

14 Claims, 5 Drawing Figures

DIGITAL FLUOROGRAPHIC SYSTEMS

FIELD OF THE INVENTION

This invention is concerned with image processing systems for diagnostic imaging and more particularly to such processing systems as used in digital fluorography.

BACKGROUND OF THE INVENTION

Image enhancement systems generally comprise four major sections in addition to the computer or central control section. They are the image acquisition section, the image processing section the storage section and the image display section. It is the purpose of the image processing section to effect the enhancement of the image that is displayed. Many times the steps taken to enhance one characteristic of the images have adverse effects on other characteristics of the images. When this occurs trade offs and comprises in the enhancement process are effected. In such cases neither characteristic is optimized. Thus improvements in the enhancement equipment or methods that avoid previously necessary trade-offs or compromises are continuously needed, sought after and desired.

In digital fluorography the video signal output of the image acquisition section is amplified at the input of the image processing section. To begin the enhancement procedure, in the past, the amplifier used in digital fluorographic (DF) systems were log amplifiers because of the exponential nature of the intensity signal. Log amplifiers operate to provide radiation intensity attenuation (object density) signals that are linear. The linear signals are a function of the intensity of the signals passing through a blood vessel under study.

However, as is well known, log amplifiers have extremely high gain around the zero point. Therefore any error or noise occurring near the zero point is greatly amplified. The amplification of the noise and errors in fact resulted in the abandonment of the "log amplifier" by most of the industry. Instead those skilled in the art opted for using the analog to digital converter on the "linear" signal from the intensifier in conjunction with look up table arrangements for the line to log conversions. However this option loses the inherent benefits of using a log amplifier on signals having exponential characteristics—if the zero neighborhood amplification problem could be solved.

BRIEF DESCRIPTION OF THE INVENTION

Accordingly there is a long felt need for new and improved equipment and procedures for preventing the amplified errors and noise introduced into the images by the log amplifiers in digital fluorographic systems. Therefore according to a broad aspect of the present invention improved digital fluorographic systems for displaying radiographic images of objects are provided, said systems comprising:

an image acquisition section for acquiring a video signal representation of the object, log amplifier means for amplifying said video signal by a logarithmic function, and means for base line clipping of said amplified video signal to improve the signal to noise ratio (SNR) and prevent amplification of signal error and noise in signals close to zero.

A related feature of the invention recognizes that for optimization of the quality of the images acquired and displayed in digital fluorography a peak T.V. camera output of approximately 1000 mV is used. It is also known that for images acquired from an image intensifier the bottom image voltage threshold is not less than approximately 20 mV and almost always not less than 50 mV when the peak is 1000 mV. Accordingly the clipping means can be adjusted to clip voltages at the log amlifier output corresponding to input voltages of less than approximately 20 mV.

The unique system features zero cut-off means to improve the signal-to-noise ratio of the system as well as to minimize image errors previously encountered because of the use of the log amplifier and the noisy and unstable zero of the TV camera. The improvement is accomplished without impairing the gain of the log amplifier.

BRIEF DESCRIPTION OF THE DRAWINGS

The above mentioned and other features and objects of the invention will be best understood when considered with the following description made in conjunction with the accompanying drawings, wherein.

GENERAL DESCRIPTION

Figure 1:
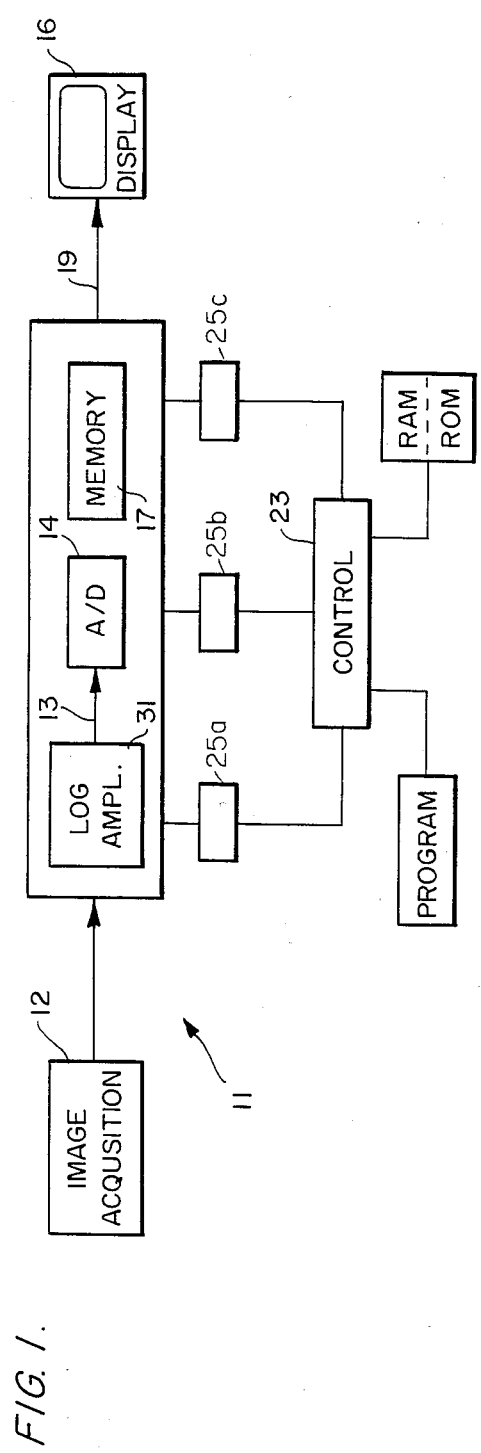
FIG. 1 is a block diagram showing of the basic components of a typical digital fluorographic system.

The digital fluorographic system 11 of FIG. 1 is shown as including an image acquisition section 12 having among other things the well known X-Ray source, X-Ray detector, image intensifier and video camera that provide the initial video signal over conductor 13 to image processing section 14.

The processing section 15 accomplishes the image enhancement steps such as subtracting, filtering, smoothing etc., as well as the necessary operations required in conjunction with the actual image enhancement steps such as amplifying, analog-to-digital converting, digital-to-analog converting, and arithmetic steps, etc. The memory function is also included in the processing section as indicated by memory block 17. The output of the processing section are video signals used for displaying the object in the display section 16. The video signals are brought from the processor to the display section through conductor 19. The central control or processor 23 shown as equipped with the usual peripheral equipment accomplishing the usual control functions and connected to the equipment of the processing section through the usual interface (I/O) units 25a, 25b, and 25c.

The amplifiers used at the input of the processing section 15 in such systems were usually log amplifiers. An improved log amplifier 31 for use in digital fluorographic systems shown in FIG. 2. The log amplifier solves the problems which plagued the industry and, in fact, resulted in abandoning the use of log amplifiers by the others.

Figure 2:
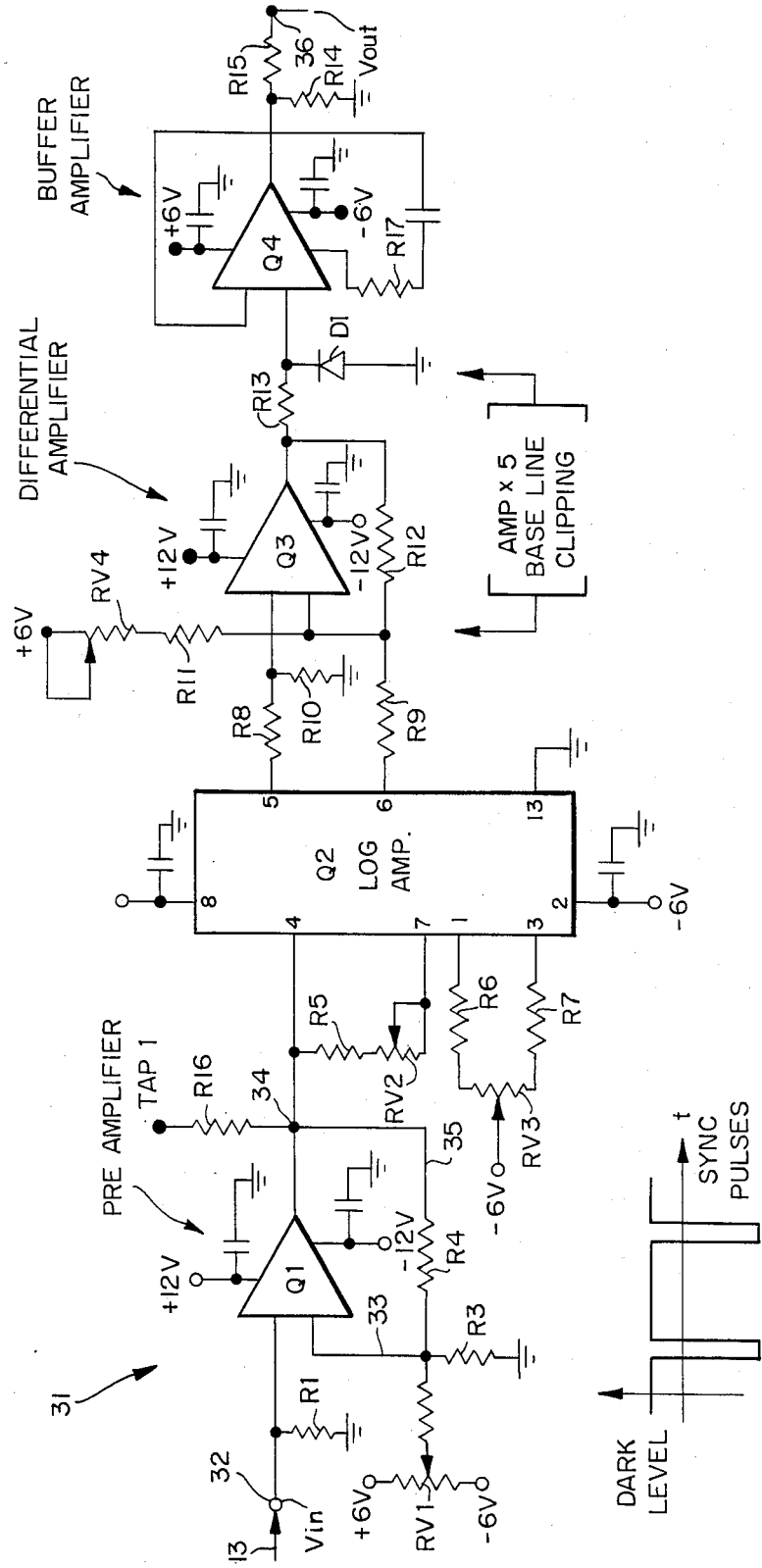
FIG. 2 is a schematic showing of a preferred log amplifier for use in the image processing component of FIG. 1, and FIGS. 3a, b, and c are graphical showings of Vout vs. Vin of the amplifier of FIG. 2.

The video signals on conductor 13 from the acquisition section 12 is coupled to input 32 of log amplifier 31 (FIG. 2). The video input signal is directed to preamplifier Q1. The input 32 is terminated with an impedance matching resistor R1—coupled from input 32 to ground.

Means are provided for adjusting the DC level output of the amplifier Q1 to be approximately zero responsive to the TV camera dark current. With the adjustment of the zero level at the preamplifier Q1 the log amplifier circuit Q2 refers the image signals to a fixed zero level.

The DC level adjusting means in the preferred embodiment of FIG. 2 comprises variable resistor RV1 connected between positive and negative voltage. The voltage at the wiper is coupled to the negative input of pre-amplifier Q1 through a voltage divider network comprising resistors R2 and R3. The junction of those resistors is coupled to the negative input of amplifier Q1 through conductor 33. A stabilizing feed-back voltage is obtained from the output of pre-amplifier Q1 on conductor 35 coupled resistor R4 to the junction point of voltage divider network resistors R2 and R3. The feedback voltage acts to vary the zero level adjust voltage as a function of the output of preamplifier Q1.

The preamplifier out-put on conductor 34 is coupled to an input terminal of the log amplifier Q2. Means are provided for adjusting the gain and the position of the Vout vs. Vin curve of the log amplifier circuitry 31 of FIG. 2. More particularly the resistance of a variable resistor RV3 is coupled between terminals 1 and 3 of amplifier Q2 in a series circuit comprising resistors R6, Rv3, and R7. The wiper of RV3 is coupled to negative voltage. This amplifier in the preferred embodiment is a commercially available log amplifier supplied by Texas Instruments under the number TL 441 CN. The variable resistor circuit controls the slope (gain) of the voltage curve as shown in FIG. 3a.

Figure 3C:
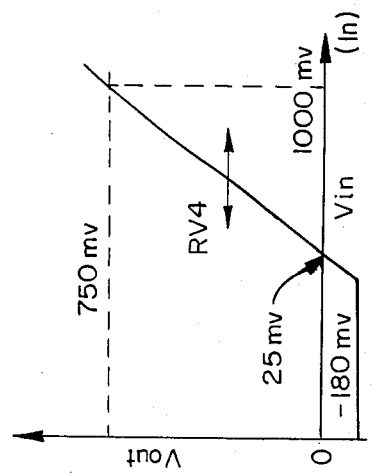
Figure 3B:
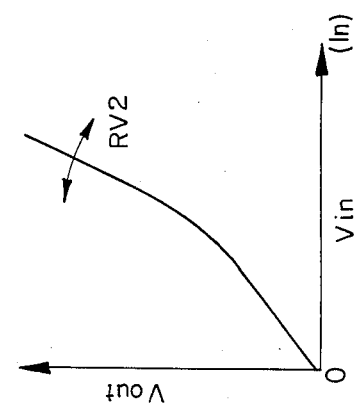
Figure 3A:
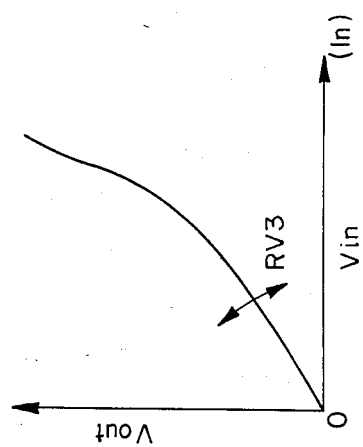

The break points of the curves of FIGS. 3a, 3b and 3c is controlled by the resistor circuiting include the variable resistor RV2 in series with resistor R5 connected between terminals 4 and 7 of amplifier Q2. Changing the resistance of RV2 by moving the wiper of RV2 moves the upper part of the curve closer to or further from the Vout axis as shown in FIG. 3b. The output of amplifier Q2 are differential log voltages at terminals 5 and 6. Means are provided for zero cut off of the output voltage. More particularly a differential amplifier Q3 and related circuit are shown in FIG. 2. The positive input of amplifier Q3 is coupled to the positive output of amplifier Q2 through resistor R8; while, the negative input of amplifier Q3 is coupled to the negative output of amplifier Q2 through resistor R9.

The positive input of amplifier Q3 is coupled to ground through load resistor R10 and the negative input of amplifier Q3 is coupled to the output of the amplifier through feedback resistor R12. Note that since the inputs to the differential amplifier Q3 are normally equal, the output will normally be zero or ground. However, means are provided for varying the DC level at the negative input of the amplifier Q3 to clip the negative signals. More particularly the negative signal clipping means comprises the positive voltage coupled through the series circuit of variable resistor RV4 and resistor R11 to the negative input of the amplifier Q3 and through resistor R12 to the virtual ground on the output of amplifier Q3. The voltage across R12 as compared to the voltage across R10 causes the output of amplifier Q3 to go negative and current to flow through diode D1 and resistor R13. As long as diode D1 conducts signals cannot pass to the next stage of circuit 31.

The next stage of output buffer amplifier Q4. When the inputs of amplifier Q3 go high enough the output of Q3 goes above the cut-off level of the diode D1 and the output signals now pass to the next stage. In preferred embodiment, the diode D1 is a Schottky diode having a fast response.

The buffer amplifier Q4 in a preferred embodiment has unity gain and is non-inverting. The output of the amplifier Q3 is coupled to the positive input of amplifier Q4. The negative input amplifier Q4 is coupled to its output for stablization purposes. The output of amplifier Q4 is coupled to the output 36 of log amplifier circuitry 31. The junction of the output of amplifier Q4 and resistor R15 is connected to ground through resistor R14.

The log amplifier circuitry 31 of FIG. 2 is shown with typical power supply inputs and capacitor filter circuits as well as a feedback circuit on amplifier Q3 comprising R17 and C1. The resistor component ohmic values and the amplifiers used in the described preferred embodiment are as follows:

RV1=20K, RV2=20K, RV3=5K, RV4=5K, R1=75, R2=10K, R3=499, R4=1.2K, R5=10K, R6=2.7K, R7=560, R8=1K, R9=1K, R10=5.62K, R11=2.7, R12=5.62K, R13=1.5K, R14=3.3K, R15=75, R16=2.2K, R17=2.2K, C1=4.3 pf.

Q1 and Q3 are HA 5195 available from Harris. Q4 is a 002 circuit available from National Semiconductors, D1 is a HP 5082-2810 Schottky diode supplied by Hewlett-Packard.

In operation, the log amplifier circuitry 31 is used, among other things, to adjust the zero level to match the dark current. This is accomplished with variable resistor RV1 and indicated with the graphical representation of the voltage at tap #1 where the voltage is measured indicated at T1 in FIG. 2.

The circuitry also operates to control the slope and the location of the breakpoints of the voltage output versus voltage input curve to vary the gain and the shape of the curve. This is accomplished using variable resistors RV3 and RV2 respectively. Ideally these adjustments are made with an "ideal curve" and the measured curve is varied to match the ideal curve.

Finally, as indicated in FIG. 3(c), (the output vs input of the system as a whole), the variable resistor RV4 is used to adjust the clipping of the output voltage by moving the break point to an input voltage that is less than the input voltages of the noises and errors. The clipping avoids the high rate of amplification of noises and errors about the zero point of the input to the log amplifier. Therefore the clipping suppresses the adverse effects the amplified noise and errors have on the output which would be normally aggravated by the high rate of amplification for signals near zero. It is understood that this method generates a noise free stable reference level (the lower clipped level) for use as a reference by the subsequent analog to digital stage.

It should be understood that while only the positive side of the voltage out versus voltage in curve has been discussed the clipping system can be applied with equal facility to the negative position of the curve. A synergistic benefit of the log amplifier described herein is the maximization of the beneficial use of variable analog to digital (A/D) units in digital fluorographic systems. A synergistic benefit of the log amplifier described herein is achieved when the A/D of FIG. 1 has variable gain and threshold. This combination maximizes the usefulness of such an A/D circuit.

The ultimate accuracy of such systems is achieved when the A/D units therein operate on log data. The log amplifier described herein enables using log data without suffering from the "zero neighborhood" high amplification adversities.

While the invention has been described with reference to a preferred embodiment it should be understood that this description should not be construed as a limitation on the scope of the invention which is defined by the accompanying claims.

What is claimed is:

1. A digital fluorographic system for displaying radiographic images of objects; said system comprising:
   an image acquisition section for acquiring video signals representative of images of the object, comprising:
   image processing means for processing said video signals prior to display, said processing means including log amplifier means for amplifying said video signals by a log function, and
   means for cutting off said amplified video signal at a value above that corresponding to the zero input of said amplifier to improve the signal to noise ratio and to prevent amplifications of signal errors close to the zero point on the response curve.

2. The system of claim 1 wherein said means for cutting off and amplified video signals comprise base line clipping means.

3. The system of claim 2 wherein said clipping means comprises shorting means for shorting the amplified video signals up to a certain value.

4. A digital fluorographic system for displaying radiographic images of objects, said system comprising:
   (a) an image acquisition section for acquiring video signals representative of images of the object;
   (b) image processing means for processing said video signals prior to display;
   (c) said processing means including log, amplifier means for amplifying said video signals by a logarithmic function;
   (d) base line clipping means for cutting off said amplified video signals at a value above that corresponding to the zero input of said amplifier to improve the signal to noise ratio and to prevent amplification of signal errors close to the zero point on the response curve;
   (e) said base line clipping means comprising shorting means for shorting the amplified video signals up to a certain value; and
   (f) said shorting means comprising normally conducting diode means for shorting the output of said log amplifier to ground up to a predetermined value.

5. The system of claim 4 wherein said diode means is a shorting diode.

6. The system of claim 4 (including A/D converter means, means for coupling said log amplifier means to said A/D converter means,) and means in said A/D converter means for varying the gain of said A/D converter means to control the amplification of the signal output of the log amplifier means.

7. The system of claim 4 including A/D converter means having a variable threshold to control the baseline clipping of the output of said log amplifier means.

8. The system of claim 7 wherein means are provided for varying the gain of said A/D converter means to further control the baseline clipping of the output said log amplifier means.

9. The system of claim 4 wherein said log amplifier means comprises a log amplifier unit, said log amplifier unit providing a positive output, said output being said amplified video signals, difference amplifier means, means for connecting said positive and negative outputs of said log amplifier unit to inputs of said difference amplifier means,
   said shorting means comprising diode means coupled to the output of said difference amplifier means,
   means for biasing said shorting means to operate above the zero output level to short the output of the difference amplifier to ground in the vicinity of zero, and
   means for varying the bias to control the cut-off point.

10. The system of claim 9 wherein said biasing means comprises variable resistor means coupling the voltage to one of said inputs of said difference amplifier.

11. The system of claim 9 wherein means are provided for controlling the breakpoint of the output of said log amplifier unit.

12. The system of claim 11 wherein means are provided for controlling the gain of said log amplifier unit.

13. The system of claim 12 including preamplifier means for coupling the video signals to the input of the log amplifier unit.

14. The system of claim 13 including buffer amplifier means for coupling the output of said difference amplifier means to the output of said log amplifier means for coupling to display means.

* * * * *